United States Patent [19]
Epperson

[11] Patent Number: 6,032,892
[45] Date of Patent: Mar. 7, 2000

[54] MANUAL/AUTOMATIC ROD AND REEL LINE RELEASE MECHANISM WITH NON-TWIST LINE WINDING MECHANISM

[76] Inventor: Frank E. Epperson, 1235 S. Birch St., Apt. 505, Aurora, Colo. 80246

[21] Appl. No.: 09/001,179

[22] Filed: Dec. 30, 1997

Related U.S. Application Data

[63] Continuation-in-part of application No. 08/629,341, Apr. 8, 1996.

[51] Int. Cl.[7] .................................................. A01K 89/01
[52] U.S. Cl. .......................... 242/227; 242/228; 242/234; 242/235; 242/236; 242/237; 242/238; 242/239; 242/240
[58] Field of Search .................................. 242/227, 228, 242/234, 235, 236, 237, 238, 239, 240

[56] References Cited

U.S. PATENT DOCUMENTS

| | | | |
|---|---|---|---|
| 3,697,011 | 10/1972 | Christensen et al. | 242/240 |
| 5,323,986 | 6/1994 | Takeuchi | 242/240 |
| 5,346,158 | 9/1994 | Epperson | 242/237 |
| 5,368,246 | 11/1994 | Epperson | 22/228 |
| 5,788,172 | 8/1998 | Rosa et al. | 242/240 |
| 5,803,384 | 9/1998 | Epperson | 242/238 |

*Primary Examiner*—Donald P. Walsh
*Attorney, Agent, or Firm*—John E. Reilly

[57] ABSTRACT

A fishing reel eliminates line twist as the fishing line is taken on or off of the spool by utilizing a non-rotating nose member and line pick-up member in combination with a rotational spool and a line-engaging control mechanism which at the beginning of the cast retracts the nose member against a forward end of the housing to capture the fishing line therebetween and, toward the end of the cast, a separate release mechanism manually releases the nose member to permit the fishing line to play freely off of the spool. The release mechanism may be a manual or automatic casting control mechanism which is mounted just forwardly of the handle portion of a fishing rod and is operable to return the nose member to an open position in response to a forward casting motion of the rod and reel.

19 Claims, 3 Drawing Sheets

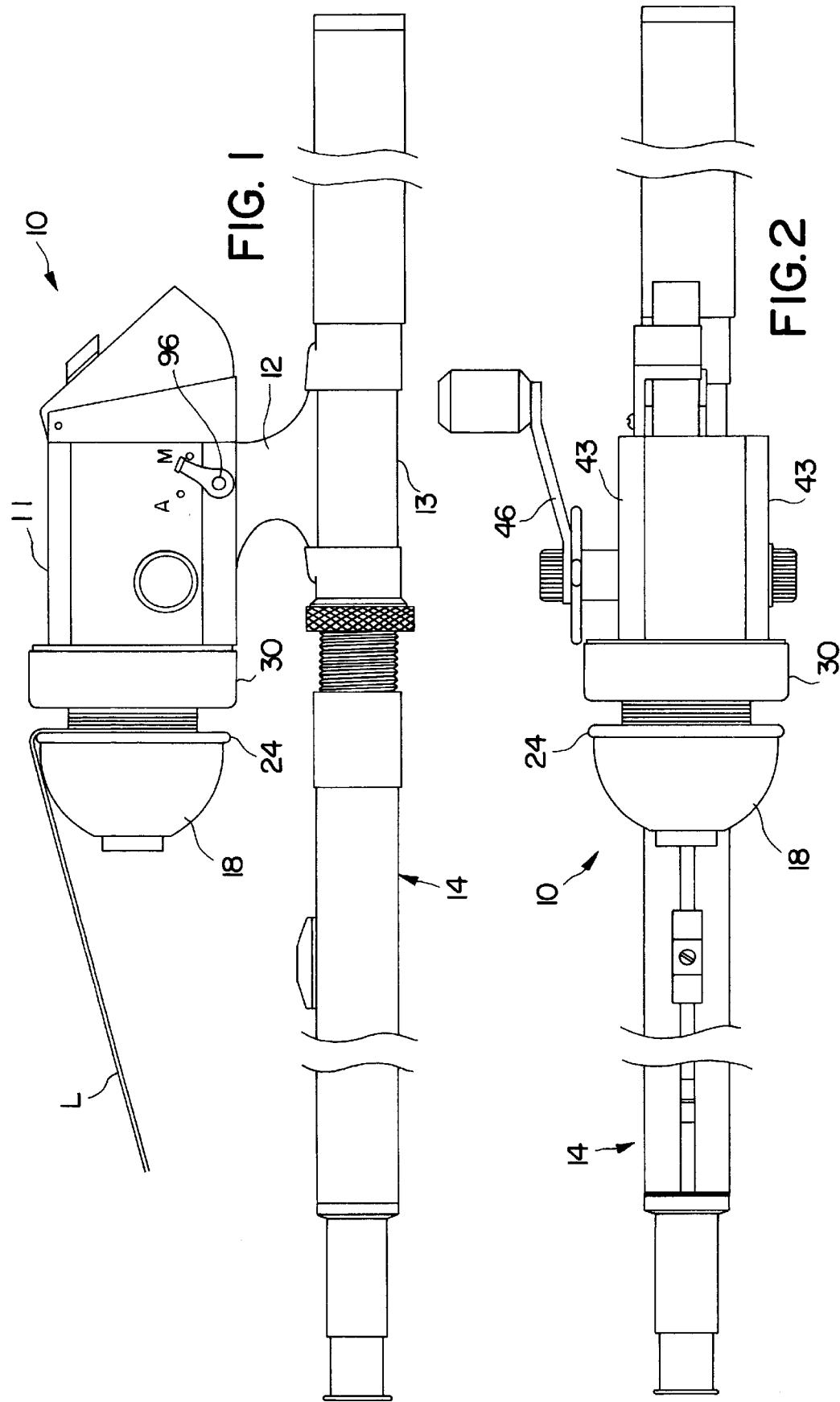

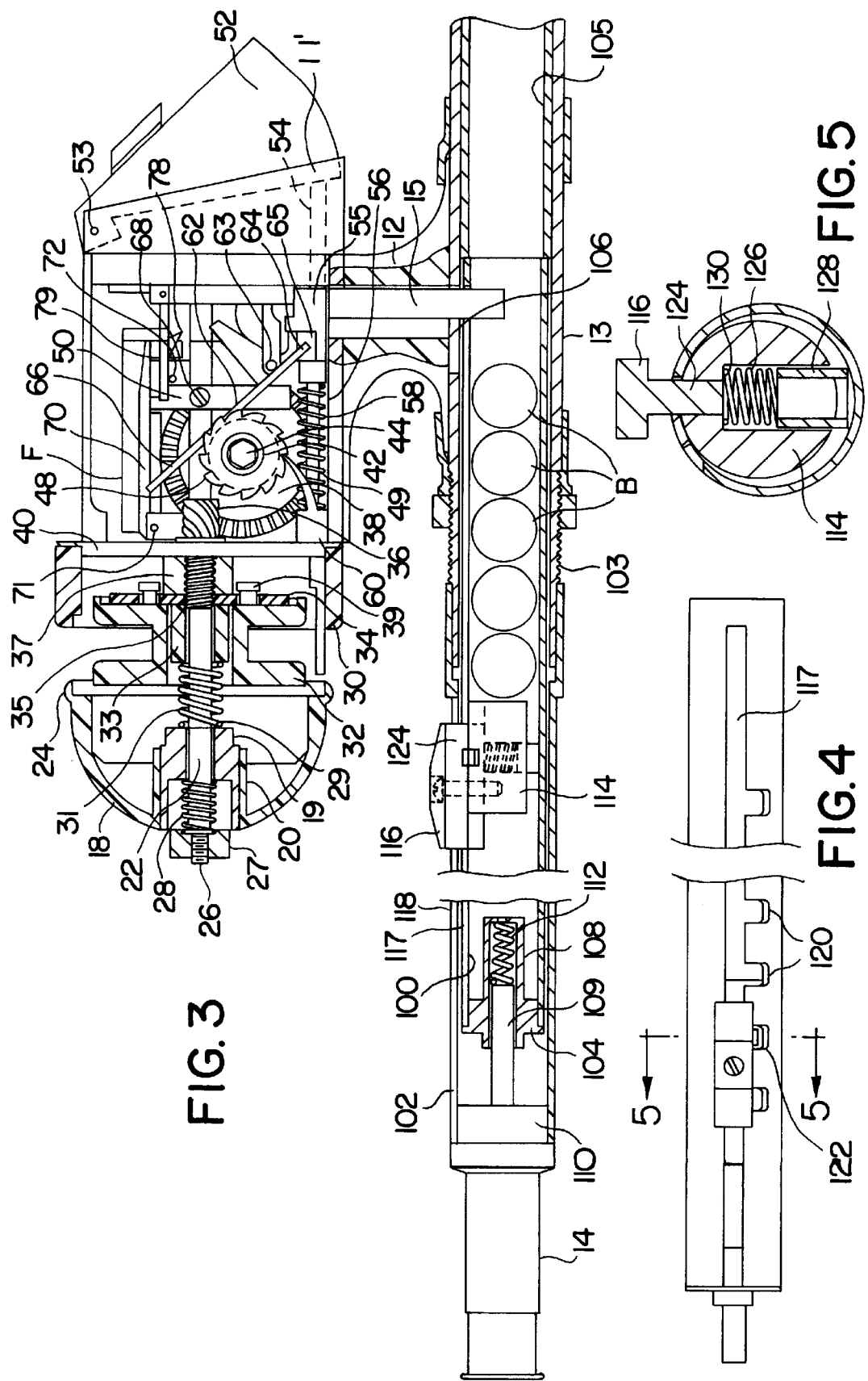

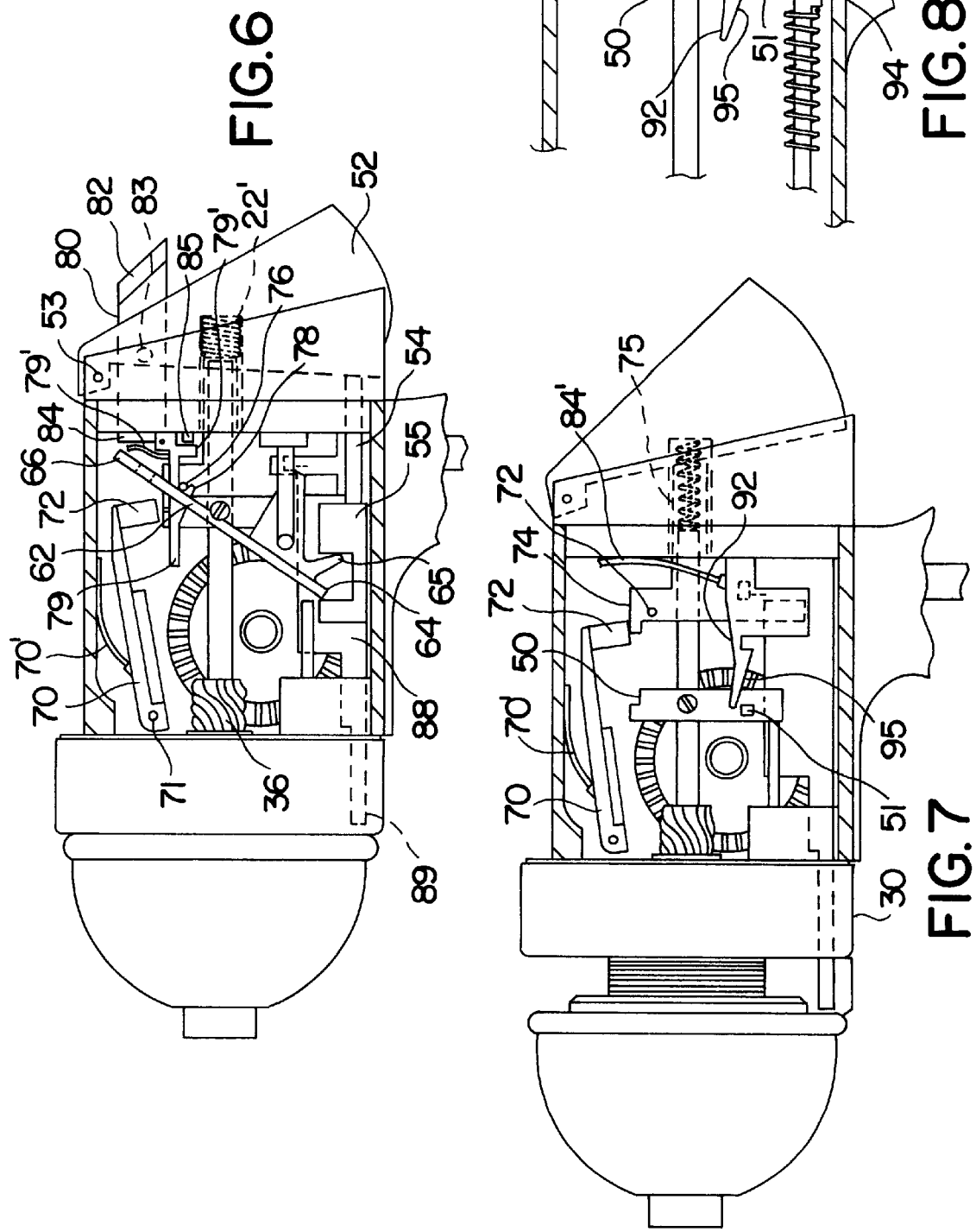

MANUAL/AUTOMATIC ROD AND REEL LINE RELEASE MECHANISM WITH NON-TWIST LINE WINDING MECHANISM

CROSS-REFERENCE TO RELATED APPLICATION

This application is a continuation-in-part application of Ser. No. 629,341, filed Apr. 8, 1996 for CENTRIFUGAL CASTING CONTROL FOR FISHING REELS, now U.S. Pat. No. 5,346,158.

BACKGROUND AND FIELD OF INVENTION

This invention relates to a casting control mechanism for fishing reels, and more particularly relates to a novel and improved method and means for manually or automatically controlling release of a fishing line off of a reel in response to the casting motion of the reel.

I have previously devised casting control mechanisms for fishing reels and reference is made in particular to U.S. Pat. No. 5,346,158 entitled CASTING REEL WITH AUTOMATIC DRAG AND CASTING MECHANISM wherein a weighted member is located in the fishing reel and, in response to the casting motion, will automatically retract a line pick-up member out of the path of advancement of the line so that it is free to unwind off of the spool. Among other problems in placing the weighted member in the reel itself is that it is difficult for the fisherman to control the point of release of the line and the weighted member cannot be adjusted or timed very easily without fairly sophisticated control mechanisms.

It is therefore proposed to mount the weighted member externally of the reel, preferably ahead of the handle of the fishing rod and, through a lever arm responsive to movement of the weighted member, automatically release the line. The weighted member preferably takes the form of ball bearings which may be easily adjusted or positioned according to the speed of cast of each individual.

Another problem associated with line release mechanisms is the tendency for the fishing line to twist when it is taken on and off the spool across some form of line pick-up member and which often results in snarling and jamming of the reel. It is proposed to eliminate any line twist by rotating the spool with respect to the line pick-up member and causing a nose end of the reel to act as a part of the level winding mechanism when the line is reeled onto the spool.

SUMMARY OF THE INVENTION

It is therefore an object of the present invention to provide for a novel and improved line release mechanism for a fishing reel which is highly reliable and efficient in operation and which eliminates twisting of the fishing line as it is taken on and off the reel.

It is another object of the present invention to provide for a novel and improved fishing line release mechanism which is easily and closely adjustable over a wide range to control the point of release of the fishing line during the casting motion and to do so automatically in response to the centrifugal force or momentum generated by the casting motion.

It is a further object of the present invention to provide for a novel and improved fishing line release mechanism for a fishing reel in which the release mechanism itself is mounted on the rod just head of the handle portion for most effective control over the line release; and further wherein the line release mechanism includes a weighted member consisting of a series of bearings disposed in the handle of a fishing rod to which the reel is attached, the bearings being adjustable in number and weight to assist in controlling the timing of the cast and the point of release during the casting operation.

An additional object of the present invention is to provide for a novel and improved automatic casting mechanism which is of simplified construction and readily convertible for use as an automatic or manually controlled casting mechanism to control the point of release of the fishing line in casting.

In accordance with the present invention, a casting control mechanism has been devised for a fishing reel in which a fishing line is wound upon a spool at one end of a drive shaft and a line pick-up member is movable into the path of the fishing line away from the spool in response to rotation of the spool and characterized in particular by release means mounted in the reel for retracting the pick-up member out of the path of the fishing line including a trip arm and centrifugal force-responsive means the latter being mounted externally of the reel to engage the trip arm and activate the release means in response to a centrifugal force resulting from a forward casting motion of the reel. Preferably, the centrifugal force-responsive means takes the form of ball bearings or a cylindrical member which is slidably mounted on the rod ahead of the handle portion to which the reel is attached, the weight being slidable in the direction of casting to activate the trip arm for the line release means. An adjustment mechanism is provided to regulate the initial position of the weight and its travel for engagement with the trip arm in response to the casting motion so that the timing and point of release of the fishing line can be controlled by the fisherman.

In order to eliminate line twist as the fishing line is taken on or off of the spool, a reciprocal nose member at the forward end of the drive shaft is movable into a closed position over the spool to capture the line between the nose and the forward end of the reel housing at the beginning of the cast, and activation of the release means will cause the nose member to move away from the forward end of the housing to release the line to unwind off of the spool until a line pick-up member is advanced by a pick-up control plate into the path of movement of the line; and in the position described, the spool is then positively rotated to reel the line onto the spool. During the reeling operation, the nose member is caused to reciprocate back and forth across the path of travel of the line over the spool to cause the line to be level-wound onto the spool.

The centrifugal force-responsive means can be employed in association with a conventional manual casting control mechanism on the reel so that the fisherman either may select the centrifugal force-responsive means or the manual casting control mechanism to cast with the reel.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is an elevational view of the preferred form of fishing reel and rod assembly in accordance with the present invention;

FIG. 2 is a top plan view of the preferred form of assembly shown in FIG. 1;

FIG. 3 is a longitudinal sectional view of the preferred form of assembly shown in FIGS. 1 and 2 and illustrating the casting mechanism prior to casting;

FIG. 4 is a top plan view in detail of an inner tube portion of the rod in the preferred form of invention;

FIG. 5 is a cross-sectional view taken about lines 5—5 of FIG. 4;

FIG. 6 is a side view with a side wall of the housing removed illustrating the relationship between parts of the casting mechanism when the thumb control button is depressed;

FIG. 7 is another view illustrating the relationship between certain parts of the casting mechanism upon completion of the cast; and FIG. 8 is a somewhat fragmentary view of a portion of the line release mechanism associated with the trip arm.

DETAILED DESCRIPTION OF PREFERRED EMBODIMENT

Referring to the drawings, a preferred form of automatic reel mechanism is illustrated in FIGS. 1 to 8 in which a casting reel 10 includes an outer housing 11 and attachment tang 12 for releasably securing the reel 10 to the handle or grip portion 13 of the fishing rod 14 in a conventional manner. A trip arm 15, as best seen from FIG. 3, extends downwardly through the hollow interior of the tang 13 with the lower extremity of the arm 15 projecting into the interior of the handle 14 so as to be in the path of travel of a weight-responsive mechanism in the handle portion and of a type to be hereinafter described.

Referring in more detail to the construction of the reel 10, a semi-spherical hollow nose portion 18 has a unitary central sleeve 20 which is mounted on the leading end of a tubular shaft 22, and the nose diverges rearwardly to terminate in a generally cylindrical skirt 24. An externally threaded portion 26 at the leading end of the shaft 22 receives a nut 27, and a coiled spring 28 is mounted under compression behind the nut to yieldingly urge an inner shoulder 19 of the sleeve 20 rearwardly against a circular rib 29 on the shaft 22.

The housing 11 is of hollow, generally rectangular configuration except for a forward, hollow cylindrical end 30 in normally spaced, facing relation to the skirt 24; and a spool 32 is keyed for rotation independently of the shaft 22 on a drive disk 34 by means of diametrically opposed pins 39 extending rearwardly from one end of the spool into slots in the disk 34. The drive disk 34 is in turn rotated by a worm gear 36 journaled on the shaft 22 and intermeshingly engaged by a circular gear 38 forming a part of the crank mechanism of the reel to be described.

An end wall 40 separates the housing 11 from the forward cylindrical end 30 but the rotation of the worm gear 36 is imparted through a threaded hollow shaft extends through the wall 40 and is drivingly engaged by the worm gear 36; and the shaft 35 extends forwardly between the shaft 22 and a boss or spacer 37 into threaded engagement with the disk 34 in order to impart the rotation of the worm gear 36 to the disk 34. A spring member 31 is interposed between the sleeve 20 and bushing 33 within the spool 32, and again the spool 32 is rotatable about the bushing 33 as well as the shaft 22 in response to rotation of the worm gear 36 during the cranking operation of the reel.

The crank mechanism includes a hub 42 extending between opposite side walls 43 of the housing 11, the hub receiving a crankshaft 44 on a crank handle 46 externally of the housing 11. A suitable drag mechanism may be incorporated into the crank mechanism in the manner described in my hereinbefore referred to U.S. Pat. No. 5,346,158. The rotation of the crankshaft 46 is imparted to the circular gear 38, the gear 38 intermeshingly engaging the worm gear 36 to impart rotation to the spool 32 during the reeling operation as described. A suitable anti-reverse mechanism of the type disclosed in my U.S. Pat. No. 4,725,017 includes a ratchet gear 48 mounted on the crankshaft 44, the ratchet teeth on the gear 48 being engageable by a dog 49 to prevent reverse rotation of the crankshaft 44.

In order to impart level winding to the line L on the spool 32, reciprocal motion is imparted to the shaft 22 and attached nose 18 by means of a rectangular slide frame F via control block 50 affixed to the shaft 22. The level winding mechanism corresponds to the mechanism described in more detail in my U.S. Pat. No. 5,346,158, the difference being that the reciprocal motion of the slide frame F is transferred via pick-up arm 70 to the control block 50 and the shaft 22 into the nose 18 and skirt 24 which reciprocates back and forth across the spool 32, the spool 32 rotating but remaining fixed against axial movement.

Now referring to the casting mechanism in more detail, a thumb button 52 is pivotally mounted for forward movement about a pivot 53 through the end of the housing 11 and includes an extension arm 54 at its lower end which is affixed to a rearward end of a slide block 55 at the lower end of the housing. The slide block 55 is slidable in an axial direction and has a front extension arm 56 which carries a spring member 58 so that when the slide block 55 is advanced forwardly toward the front end of the reel will cause the spring 58 to be compressed between the slide block and a fixed block 60 at the forward end of the housing.

A main control lever 62 is pivoted at 63 with its lower end 64 disposed in a notch 65 in the slide block 55 so that when the slide block is advanced forwardly it will cause upper end 66 of the lever 62 to pivot rearwardly against mounting screw 68 on the control block 50 thereby causing rearward retraction of the control block 50 along with the shaft 22 and specifically will cause retraction from the position shown in FIG. 3 to that shown in FIG. 6. Normally, the control block 50 is held against retraction by upper pivot arm 70 which is pivoted at 71 and has a stop member 72 at its free rearward end behind a pick-up arm control block 74. The control block 74 is affixed to a sleeve 75 in outer concentric relation to the tubular shaft 22 and independently slidable with respect to the shaft 22. A latch pin 76 on a side of the block 74 is engageable with a catch 78 on latch 79 so that when the control block 50 is retracted by the pivot lever 62 it will simultaneously cause rearward slidable movement of the control block 74 until the pin 72 enters the catch 78, as shown in FIG. 6. Pivotal movement of the latch 79 is controlled by a manual release lever arm 80 having a rearward end 82 projecting rearwardly beyond the thumb button 52 and pivotally mounted at 83 to a side wall of the housing extension 11' which receives the thumb button 52. A downwardly extending control plate 84 includes a lateral extension or dog 85 which bears against a downward extension 79' of the latch 79 so that when the rearward end 82 is manually engaged and pivoted downwardly about the pivot 83 will cause the control dog 85 to swing upwardly and slightly forwardly thereby raising the latch 79 away from engagement with the pin 76 on the pick-up rod control block 74.

A line pick-up member 88 includes a pick-up rod 89 which is slidable between a retracted position, FIG. 6, within the forward end 30 of the housing to an extended position, FIG. 7, projecting forwardly beyond the end 30 of the housing into engagement with the skirt 24 on the nose 18. The member 88 is controlled by the movement of the control block 74 bearing against a rearward end of the pick-up member 88 as generally illustrated in FIGS. 6 and 7.

Referring to FIG. 8, a lug 51 projects laterally from the lower end of the control block 50 and, when the control block 50 is retracted by the thumb button 52, will cause the lug 51 to slide into engagement with a notch 90 on latch 92 which is pivoted at 93 in a vertical plane directly behind the slide block 55 and therefore not visible in FIGS. 3 and 6. Similarly, the trip arm 15 is in the same plane as the latch 92, an upper edge 15' of the trip arm being engageable with lower extension 94 of the latch 92 so that when the trip arm 15 is advanced forwardly in a manner to be described will raise the latch 92 to permit release of the lug 51 and forward advancement of the control block 50 and tubular shaft 22 under the urging of return spring 22' at the rearward end of the shaft 22, as illustrated in FIGS. 6 and 7. It is to be further noted that the lower extension 94 is engageable by an inward projection leg 96' of a manual control dial 96 on the side wall of the housing, as shown in FIG. 1. When the dog 96 is in the automatic "A" position, the dog will be controlled entirely by the trip arm 15 in releasing the control block 50; however, when the dog 96 is turned to the manual "M" position will cause the projection leg 96' to rotate against the extension 94 and raise the latch 92 so that the control block 50 is no longer controlled by the trip arm 15 but instead is manually controlled in a manner to be described.

A return spring 84' projects upwardly from the latch 92 to bear against the front plate 84 of the pivot arm 82 to return the arm 82 to its original position as shown in FIG. 6 after releasing the latch 79. Similarly, another return spring 79' on the latch 79 bears against the upper end of the plate 84 to yieldingly urge the latch 79 to return to its downward position, as shown in FIG. 3, in preparation for the next cast. Another return spring 70' on the pick-up arm 70 bears against the upper wall of the housing 11 to urge the arm 70 into a position in which its stop member 72 slides behind the upper end of the block 74, as shown in FIG. 3, in preparation for the next cast.

In the automatic cranking position as described, the trip arm 15 is activated by a centrifugal force-responsive mechanism in the handle portion and specifically wherein a tube 100 is disposed in inner concentric relation to an outer tube 102 between the rod portion represented at 14 and grip portion 13, the outer tube 102 being threadedly connected as at 103 to the grip portion and the inner tube extending between a boss 104 at its forward end and an inner wall 105 of the grip portion at its rearward end. The tang 15 extends through a slotted portion 106 through the outer wall of the grip portion 13 and tube 100 so as to be positioned directly behind a centrifugal force-responsive member preferably in the form of one or more ball bearings represented at B. The boss 104 includes a central bore 108 to receive a center pin 109 projecting rearwardly from an end wall 110 of the outer tube 102, the boss being spring-loaded by means of a coil spring 112 at one end of the pin 109 to yieldingly resist or dampen the forward sliding movement of the tube 100.

A limit stop 114 is mounted within the inner tube 100 to impart or translate the force of the ball bearings B, rolling outwardly when the rod and reel are cast, into the tube 100 thereby causing the tube 100 to travel forwardly against the resistance of the spring 112 and as a consequence advancing the trip arm 15 forwardly to release the latch 92 from engagement with the dog 51. Preferably, the limit stop member 114 can be adjustably positioned along the length of the tube 100 by means of a manual adjustment member 116 which projects upwardly from the limit stop 114 through aligned slots 117 and 118 in the inner and outer tubes 100 and 102, respectively, and which slots 117 and 118 extend along the greater length of the outer tube 102. In addition, as best seen from FIG. 4, the inner slot 117 is provided with a series of notches 120 at longitudinally spaced intervals, and the manual thumb control 116 has a pair of longitudinally spaced, lateral projections 122 on a flange portion 124 of the manual control 116. The manual control is normally urged in an upward direction by compression spring 126 which is interposed between a lower end stop 128 and upper shoulder 130 within the body of the limit stop 114. In this way, the manual control 114 may be adjusted by depressing the upper pad 116 to remove the projections 122 from the notches 120 and advancing to another selective set of notches 120 along the length of the slot 117, following which releasing pressure from the upper pad 116 will permit the projections to enter the selected notches and lock the limit stop 114 in the desired position. The combination of the number of ball bearings B and the positioning of the limit stop 114 affords a convenient method of adjustment for the timing of the cast and point of release of the latch 92 as will become more apparent hereinafter from a description of the automatic casting operation.

In use, when casting in the automatic position, the dial 96 is set in the "A" position as shown in FIG. 1 and, prior to casting, the elements are in the relationship shown in FIG. 3 with the control blocks 50 and 74 in the forward position and the pick-up arm 70 resting with the stop member 72 behind the control block 74. The cast is initiated by the fisherman drawing the rod backwards in an overhand motion in a conventional manner and depressing the thumb button control 52 thereby forcing the lower slide block 55 forwardly and pivoting the lever 62 upwardly to raise the arm 70 and then rearwardly against the locking screw 68 to force the control blocks 50 and 74 rearwardly. In this manner, the tubular shaft 22 is forced rearwardly to retract the skirt 24 on the cone 18 rearwardly into engagement with the leading edge of the housing end 30 so as to capture the line L therebetween. Continued retraction of the shaft 22 causes the pin 76 on the control block 74 to move into engagement with the catch 78 and to fully retract the pick-up rod 89 into the position shown in FIG. 6. When the rod and reel are propelled forwardly by the fisherman and the thumb button 52 is released, the force-responsive mechanism in the handle 13 will cause the inner sleeve 100 to slide forwardly and advance the trip arm 15 forwardly so as to lift the latch 92 away from engagement with the lug 51 and release the front control block 50 so that the cone is free to advance forwardly under the urging of the return spring 31 in front of the spool 32. The line L is then free to play freely off of the spool and advance forwardly until the manual control button 82 is depressed to lift the latch 79 away from engagement with the pin 76 whereupon the control block 74 will slide in a forward direction under the urging of spring 22' and cause the pick-up rod 89 to bridge the gap between the forward end 30 and the skirt 24 into the path of travel of the line L. Any slack in the line L can be taken up by slight rotation of the crank mechanism; and of course the line can be reeled in by continued cranking to impart rotation to the spool 32.

When it is desired to operate in the manual M position, the dial 96 is rotated to cause the projection 97 to lift the latch 92 out of the path of engagement of the control block 51. Otherwise, the elements are in the same relationship as illustrated in FIG. 3. The casting operation is the same as in the automatic position; i.e., depressing the thumb button 52 first to retract the cone 18 and simultaneously latch the control block 74 in the retracted position. However, at the end of the cast, when the thumb button 52 is released, the return spring 58 will urge the slide block 55 rearwardly causing the pivot lever 62 to return to its original position shown in FIG. 3 away from the control block 50 so that the control block 50 is free to advance forwardly along with the shaft 22 under the urging of the return spring 31 so that the nose 18 is advanced forwardly, also, to release the line L to play out from the spool 32. The manual control arm 82 is depressed as in the automatic operation to advance the line pick-up rod 89 into the path of the line L as a preliminary to rewinding the line L back onto the spool 32.

During the rewinding or reeling operation, it is important to note that the spool 32 is positively rotated with respect to the pick-up rod 89 and nose 18, as shown in FIGS. 3 and 7. However, the nose 18 as well as the pick-up rod 89 are caused to reciprocate back and forth in an axial direction to level-wind the line L back onto the spool. In other words, the spring-loaded rod 89 will foul the reciprocal movement of the nose 18 and remain in contact with the skirt 24 during the level-winding operation. In this regard, it will be apparent that the pick-up number 88 and its associated rod 89 may be returned automatically into the path of the line L during the reeling operation by eliminating the manual release arm 82 as well as the latch 79 and permitting the control block 74 to follow the reciprocal movement of the pick-up arm 70 and slide frame F.

In the automatic casting position as described, the ball bearings B are positioned in the forward end of the handle and ahead of the actual gripping portion on the handle, or in other words outside of the circumference of the casting circle, so as to most effectively respond to the casting motion and slide forwardly into engagement with the stop 114. The degree of force and point of release of the trip arm 15 during the casting motion can of course be adjusted by the setting of the stop member 114 as described as well as the number of bearings B and their density. It will be evident that an elongated cylindrical weight member can be employed in place of the ball bearings B but would have greater frictional engagement with the inner surface of the tube 100 than the bearings B.

It is therefore to be understood that while preferred and modified forms of invention are herein set forth and described, the above and other modifications and changes may be made in the construction and arrangement of parts comprising both the reel 10 and rod 14 without departing from the spirit and scope of the present invention as defined by the appended claims and reasonable equivalents thereof.

I claim:

1. In a casting control mechanism wherein a reel includes a fishing line wound upon a spool adjacent to one end of a drive shaft, a fishing rod having a handle portion to which said reel is attached, and a line pick-up member is movable into the path of advancement of said fishing line onto and away from said spool, the improvement comprising:

a retractable nose member mounted on said one end of said drive shaft;

line-engaging control means mounted in said reel for retracting said nose member into a closed position capturing said line between said nose member and said housing and further retracting said pick-up member out of the path of advancement of said fishing line; and line release means for engaging said line-engaging control means to return said nose member to an open position releasing said line to unwind from said reel.

2. In a mechanism according to claim 1 wherein said nose member and said pick-up member are fixed against rotation.

3. In a mechanism according to claim 1 wherein said nose member and said pick-up member are reciprocal in unison in response to rotation of said spool.

4. In a mechanism according to claim 1 wherein a pivotal control arm is manually engageable to retract said nose member into said closed position, and a second control arm is manually engageable to release said pick-up member to return into the path of advancement of said fishing line independently of the return movement of said nose member to said open position.

5. In a mechanism according to claim 4 wherein said line-engaging control means includes a control block mounted on said shaft, and a pivot lever responsive to pivotal movement of said control arm to retract said control block and said drive shaft in order to retract said nose member into said closed position.

6. In a mechanism according to claim 4 wherein said pick-up member includes a follower block on said drive shaft which is retracted by said pivotal control arm into engagement with a releasable latch in order to releasably retain said pick-up member out of the path of advancement of said fishing line.

7. In a mechanism according to claim 6 wherein said second control arm is engageable with said releasable latch to release said follower block for advancement of said pick-up member across the path of advancement of said fishing line.

8. In a casting control mechanism, the combination comprising a reel including a fishing line wound upon a spool adjacent to one end of a drive shaft, a fishing rod having a handle portion to which said reel is attached, and a line pick-up member movable into the path of advancement of said fishing line onto and away from said spool, the improvement comprising:

a retractable nose member mounted on said one end of said drive shaft;

line-engaging control means mounted in said reel for retracting said nose member into a closed position capturing said line between said nose member and said housing and further retracting said pick-up member out of the path of advancement of said fishing line;

a trip arm extending between said reel and said rod; and line release means mounted on said rod for engaging said trip arm to return said nose member to an open position in response to a forward casting motion of said reel and said rod.

9. In a mechanism according to claim 8 wherein said line release means includes a weight member slidable in a lengthwise direction through a portion of said rod forwardly of said handle portion in response to the forward casting motion of said reel and said rod, and an activating member is responsive to slidable movement of said weight member to engage said trip arm to return said nose member to the open position.

10. In a mechanism according to claim 8 wherein said weight member is defined by ball bearings, and said activating member includes a hollow tube surrounding said ball bearings having a stop member at one end.

11. In a mechanism according to claim 10 wherein said stop member is adjustable in an elongated slot in said activating member to vary the distance of travel of said ball bearings through said tube.

12. In a mechanism according to claim 11 wherein said elongated slot includes means for adjustably locking said stop member at a selected position on said tube.

13. In a casting control mechanism wherein a reel includes a housing and fishing line wound upon a spool mounted on a drive shaft adjacent to one end of said housing, a fishing rod having a handle portion to which said reel is attached, a nose member mounted on said one end of said drive shaft and a line pick-up member is movable into the path of advancement of said fishing line onto and away from said spool, the combination therewith comprising:

line-engaging control means for retracting said nose member against said one end of said housing to capture said line therebetween and further retracting said pick-up member out of the path of advancement of said line;

a trip arm extending between said reel and said rod;

line release means mounted on said rod for engaging said trip arm to release said line from said line-engaging control means in response to a forward casting motion of said reel and said rod; and means for releasing said pick-up member to return into the path of advancement of said fishing line onto said spool between said nose member and said housing.

14. In a mechanism according to claim 13 wherein said nose member and said pick-up member are fixed against rotation and are reciprocal in unison in response to rotation of said spool.

15. In a mechanism according to claim 13 wherein said line release means includes a weight member slidable in a lengthwise direction forwardly of said handle portion in response to centrifugal force generated by the forward casting motion of said reel and said rod.

16. In a mechanism according to claim 15 wherein said weight member is movable through a tubular member in said rod.

17. In a mechanism according to claim 16 wherein said weight member is defined by ball bearings, and said tubular member has a stop member at one end.

18. In a mechanism according to claim 17 wherein said stop member is adjustable in an elongated slot in said tubular member to regulate the distance of travel of said ball bearings through said tubular member.

19. In a mechanism according to claim 18 wherein said elongated slot includes means for adjustably locking said stop member at a selected position on said tubular member.

\* \* \* \* \*